US007340475B2

United States Patent
Chowdhary et al.

(10) Patent No.: US 7,340,475 B2
(45) Date of Patent: Mar. 4, 2008

(54) EVALUATING DYNAMIC EXPRESSIONS IN A MODELING APPLICATION

(75) Inventors: Pawan R. Chowdhary, Croton-on-Hudson, NY (US); Haifeng Xi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 11/136,362

(22) Filed: May 25, 2005

(65) Prior Publication Data

US 2007/0006128 A1  Jan. 4, 2007

(51) Int. Cl.
G06F 7/00 (2006.01)
G06F 17/30 (2006.01)
G06F 17/00 (2006.01)
G06F 9/44 (2006.01)
G06F 9/45 (2006.01)

(52) U.S. Cl. ............... 707/101; 707/4; 707/5; 707/104.1; 707/102; 717/104; 717/114; 717/141

(58) Field of Classification Search .......... 707/3, 707/4, 5, 9, 102, 104.1, 101; 709/246; 717/104, 717/114, 141

See application file for complete search history.

(56) References Cited

U.S. PATENT DOCUMENTS

| 5,664,173 | A * | 9/1997 | Fast ................ 707/4 |
| 5,721,903 | A * | 2/1998 | Anand et al. ........... 707/5 |
| 5,794,250 | A * | 8/1998 | Carino et al. .......... 707/9 |
| 6,263,328 | B1 * | 7/2001 | Coden et al. .......... 707/3 |
| 6,820,135 | B1 * | 11/2004 | Dingman et al. ...... 709/246 |
| 2003/0101169 | A1 * | 5/2003 | Bhatt et al. ........... 707/3 |
| 2005/0120014 | A1 * | 6/2005 | Deffler ................ 707/4 |
| 2005/0131891 | A1 * | 6/2005 | Nonko et al. .......... 707/4 |
| 2005/0210002 | A1 * | 9/2005 | Pal et al. ............. 707/3 |
| 2006/0026556 | A1 * | 2/2006 | Nishimura ........... 717/104 |
| 2006/0112134 | A1 * | 5/2006 | Tsuboi et al. ....... 707/102 |
| 2006/0190478 | A1 * | 8/2006 | Owens et al. ....... 707/102 |
| 2006/0225055 | A1 * | 10/2006 | Tieu ................ 717/141 |
| 2006/0259503 | A1 * | 11/2006 | Bradateanu et al. ... 707/102 |
| 2007/0083548 | A1 * | 4/2007 | Li et al. ............ 707/102 |

OTHER PUBLICATIONS

DeHaan et al., A Comprehensive XQuery to SQL Translation using Dynamic Interval Encoding, SIGMOD 2003, Jun. 9, 2003.*

* cited by examiner

*Primary Examiner*—Pierre Vital
*Assistant Examiner*—Christopher P Nofal
(74) *Attorney, Agent, or Firm*—Whitham, Curtis, Christofferson & Cook, PC; Stephen C. Kaufman

(57) ABSTRACT

Development and use of a computer program in an arbitrary language are facilitated by representing expressions to be dynamically evaluated in a simple syntax compatible with a standard language. The method for evaluating the expressions must provide a pattern or template containing the form and syntax required for an embedded standard language query in the arbitrary language. The representation of the expression in the simple syntax is detected and the expression, variables contained in the expression and the name of the result of an evaluation of the expression are extracted and placed in the template or pattern to derive an intermediate form of the expression. Quantitative data developed by the computer program when it is run is substituted for the variables in the intermediate form of the expression to form a standard language query embedded in the arbitrary language program which is then evaluated by a standard language evaluation engine.

13 Claims, 3 Drawing Sheets

```
WITH temp1 (variable1, variable2, ..., variableN) AS    } 210
(
    SELECT variable1 AS variable1,
           variable2 AS variable2, ......,
           variableN AS variableN,
    FROM temptable
);
SELECT $ModelExpression$ AS output FROM temp1;          } 220
```

*Figure 2*

EVALUATING DYNAMIC EXPRESSIONS IN A MODELING APPLICATION

BACKGROUND OF THE INVENTION

1. Field of the Invention

The present invention generally relates to computer modeling and, more particularly, to the evaluation of expressions usually included in a computer model of a device or complex system including but not limited to business process models.

2. Description of the Prior Art

It has long been recognized that computers and data processors are particularly applicable to and unexcelled at repetitively performing a sequence of operations of arbitrary length and complexity. For that reason, simulation of physical systems to, in effect, allow observation of the performance of such systems under different sets of conditions has been a principal application of computers since the development of the earliest practical digital data processors. Computer simulation techniques have steadily increased in complexity and sophistication since that time to the point that modeling can presently be applied to highly complex business methods. For an enterprise to be competitive, the ability to perform predictive analysis on a large amount of data is very important to, for example, analyze a trend, determine thresholds and decision points and discover new opportunities. Such applications are currently referred to as business process modeling (BPM) and the capability of modeling complex business processes accurately is becoming an indispensable management tool with the number of business modeling applications increasing at a rate of more than 7% per year. Possibly as a result of such growth and levels of interest, numerous languages and programming methods have been developed to support and facilitate representing dynamic expressions in models. Among these languages and programming methods are Macromedia ColdFusion™ W3C XPath™, EXSLT™, Apache JEXL™ and JavaCC™, all of which are proprietary.

Modeling applications or, simply, models, to perform the function of simulation of a device or system and allow observation of the simulated device or system under differing conditions will, almost invariably, include one or more expressions which may be dynamically evaluated during the simulation. Such expressions are usually in the form of a string (e.g. "sqrt (b+c)") and contain variables whose values are determined at runtime of the simulation. These expressions are developed by the programmer in the course of developing a given simulation/modeling application (sometimes referred to simply as "model") and thus may be entirely unique to each application. As a practical matter, a developer of a modeling language or modeling tool must be certain that the language or tool is complete and operable independent of any other resources which may be available on any machine on which the tool or language is run. Therefore, the language or tool must, itself, support the representation and evaluation of expressions in accordance with its own rules and syntax. Accordingly, if one of the above proprietary languages is used for the modeling application, the developer must use vendor-specific syntax to represent the desired expression in the model while the proprietary language may be somewhat limited in computational features. Conversely, while it is known that many platforms include database managements systems (DBMS) which, in turn, include the capability of responding to queries and performing mathematical calculations in a standardized language such as Standard Query Language (SQL), a programmer or developer who may be highly skilled in a proprietary language may not be certain that such a capability will exist on a given platform on which the model may be run and may be less skilled in regard to programming in a standard language and/or the syntax and format required to embed standard language queries in an application otherwise written in a proprietary language.

Use of proprietary languages to quantitatively represent potentially complex device or system properties and/or behaviors with accuracy using a substantially unique syntax will often involve very steep learning curves and is subject to syntactical errors which may be difficult to detect. These difficulties for the developer of the model often lead to the writing of a special purpose evaluation engine which parses the expression string, substitutes values for variables performs a computation, returns a result and the like. Such evaluation engines are not predictable in regard to time required for execution of the evaluation (e.g. there is no guarantee that the amount of time required for execution will be acceptable; referred to as being "not scalable") and which require impractical amounts of effort to port to different programming languages while it may be highly desirable, particularly for business process modeling (BPM) to execute the model or portions thereof at different nodes of a distributed network or system including many different and not necessarily compatible platforms and languages.

SUMMARY OF THE INVENTION

It is therefore an object of the present invention to provide a method and apparatus to support dynamic expression evaluation which is predictably rapid and efficient and which can be implemented with the use of any language found to be advantageous or suitable for modeling.

It is another object of the invention to provide a method and apparatus allowing a simple and straightforward representation of an expression to be dynamically evaluated which avoids a need for any particular skill in embedding instructions or statements in a standard programming language within a modeling application or model written in a proprietary language.

In order to accomplish these and other objects of the invention, the invention provides for the expression to be presented in or converted to an intermediate standardized form for evaluation which is supported by virtually all programming languages and which provides a rich mathematical computation capability.

In accordance with one aspect of the invention, a method and a program recorded on a computer readable medium are provided to perform steps of representing an expression and definitions of variables associated with the expression in a syntax compatible with a standard language, parsing the modeling application to extract the expression and definition of variables, placing the expression and definitions of variables into a pattern to represent the expression in an intermediate form corresponding to an embedded standard language query for the arbitrary language, placing data into the embedded standard language query, and evaluating the expression containing the data.

In accordance with another aspect of the invention, apparatus for evaluating an expression during modeling of a system or operation including, in combination, a data processor running a model in an arbitrary language to determine quantitative values of variables included in an expression contained in the model, an arrangement (preferably a parser in some circumstances which will be evident to those skilled in the art) for detecting the representation of the expression which is in a form compatible with a standard language query and extracting at least the expression and variables contained in the expression, an arrangement for placing the expression and variables contained in the expression into an intermediate form corresponding to an embedded standard language query in the arbitrary language, an arrangement for substituting said quantitative values for variables in the intermediate form representation of the expression to develop a standard language query, and a standard language evaluation engine for evaluating the standard language query.

BRIEF DESCRIPTION OF THE DRAWINGS

The foregoing and other objects, aspects and advantages will be better understood from the following detailed description of a preferred embodiment of the invention with reference to the drawings, in which:

FIG. 2 illustrates an SQL Query template in accordance with a preferred embodiment of the invention.

DETAILED DESCRIPTION OF A PREFERRED EMBODIMENT OF THE INVENTION

Figure 1:
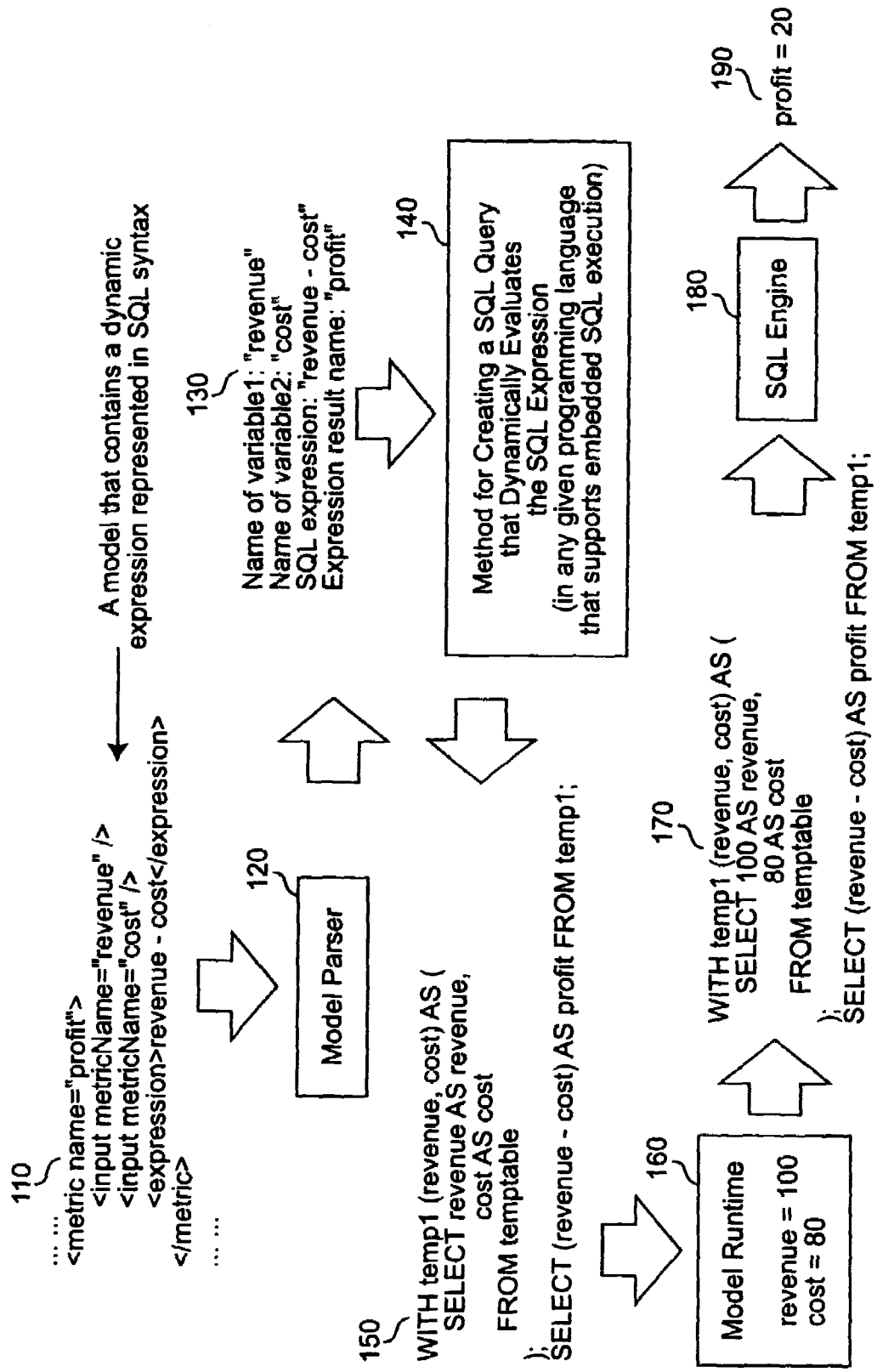
FIG. 1 is a diagram useful in facilitating an understanding of the basic principles of the invention.

Referring now to the drawings, and more particularly to FIG. 1, there is shown a diagram useful for conveying an understanding of the basic principles of the invention. FIG. 1 is intended to represent a portion of the execution of a simulation or modeling application (hereinafter sometimes simply "model") written in an arbitrary computer executable language; during which an arbitrary expression contained in the model or modeling application is to be evaluated. This portion of the model in which an expression is dynamically evaluated in indicated at 110. The portions of the model preceding and possibly following this dynamic expression evaluation portion of the model are written in any convenient language to provide a simulation of the operation of a business (or any other device or methodology) under different sets of quantifiable circumstances (e.g. interest rates, changes in costs of raw materials and/or labor, changes in customer base demographics and the like) and develop particular values for variables included in this (or later) expression which is to be dynamically evaluated.

The distinction between a software model and the language in which it is written must be borne in mind during the following discussion of the invention. At the same time, it must be understood that it is immaterial whether an expression to be dynamically evaluated reflects a characteristic of a business process or its management or is, itself, a (potentially distinctive) characteristic of the business process or its management. That is, different businesses can experience or exhibit differences in efficiency, profitability and the like based on a (possibly subtle) difference in a criterion for operation or management in the same manner that such differences may be grounded in other parameters such as cost of raw materials, resources allocated to research and development and the like.

In general, the invention is most readily applied during the development of a model as the computer executable code is being written in an arbitrary but convenient language for development of a modeling application or model. In other cases, the model for a particular business or other device or method may have been previously developed in all pertinent detail including the expressions to be dynamically evaluated. Between these two extremes, other models may be based on existing models but may require review and possible revision of some internal methodology and expressions to be dynamically evaluated to customize an existing model to accurately reflect the business, device or method being modeled. Such review for possible customization should probably be performed even if the model is already developed in detail.

In any of these circumstances, the practice of the invention in accordance with its basic principles begins with provision of any expression to be dynamically evaluated in a form where the expression is represented in a standard language syntax such as Standard query language (SQL) syntax such as is depicted at 110. The form of such a syntax should allow detection by a parser or other arrangement such as a digital filter or the like to identify the presence of an expression to be dynamically evaluated in order to invoke the operation of the invention. This syntax preferably has a simple form which supports a straightforward conversion of an expression from any arbitrary language or facilitates the development of a representation of an expression by defining the expression at a very fundamental and elementary level. By the same token, the representation of an expression and the definitions of its variables in such a simple and straightforward manner avoids a need to learn or use details of a proprietary language to represent an expression to be dynamically evaluated. In the case illustrated, the syntax defines the name of the metric to be determined (e.g. "profit"), the names of the metrics which are to be input for the evaluation of the expression (e.g. "revenue" and "cost") and the expression itself (e.g. "revenue−cost") which is to be evaluated in terms of its constituent inputs. This syntax supports a one-to-one correspondence between lines of code portion 110 and an SQL query based on a standardized template in accordance with the invention which contains all necessary format and syntax necessary for embedding the expression and instructions sufficient for its evaluation in a standard language within a model written in an arbitrary (e.g. proprietary) language.

When the model is run, the modeling program or model is parsed, as illustrated at 120, and syntax similar to that illustrated at 110 is recognized (e.g. by digital filtering for specific bit patterns or other techniques familiar to those skilled in the art) as an expression to be dynamically evaluated (sometimes referred to hereinafter as a model expression) to invoke operation of the invention. In response to that recognition, indicating the presence of an expression to be dynamically evaluated, and parsing of the lines of code comprising the variable definitions and expression, the information is used to define the names of the variables represented (e.g. Variable1, Variable2, etc.), the expression to be evaluated (e.g. revenue−cost) and the name of the result of the evaluation (e.g. profit), as illustrated at 130. The information in this form is then used to produce a query in standard form, preferably SQL, which will dynamically evaluate the expression, as illustrated at 140. This function is preferably performed by simply placing the information in the form shown at 130 into a query template or pattern appropriate to an embedded standard language query in accordance with the language used for the remainder of the model, as will be discussed in greater detail below, yielding a query in a standard form as shown at 150.

As illustrated at 160, when the model is run, quantitative values will be derived for the input metrics identified at 110 (and possibly others which appear in other expressions to be dynamically evaluated which are also contained in the model. These values are substituted into the standard language (e.g. SQL) query 150 to yield a representation of the expression to be evaluated as a standard language query as illustrated at 170 which is effectively embedded in the model regardless of the programming language used for the remainder of the model and which can be evaluated by a standard evaluation engine corresponding to the standard language of the embedded query, preferably SQL, as shown at 180 to yield result 190. Since the invention employs an existing engine which has extensive mathematical computation capacity, the time and processing required for evaluation of an expression is predictable and scalable and can be ported between platforms and avoids any limitation on calculation capability arising from a proprietary language and any need for developing a custom engine for dynamic evaluation of an expression.

In essence, the invention exploits the fact that most data processing platforms will include software and/or hardware or a combination thereof which will support use of a standard language for representing an arbitrary expression and to support the evaluation of the expression in that standard language. Further, the invention exploits the fact that the number of variables and values in a given expression will almost invariably be the same regardless of the language used to represent that expression. Therefore the translation or conversion of an expression in any language to a corresponding expression in a standard language can be quite straightforward and implemented much in the nature of applying a template to the original expression as will be discussed in greater detail below.

While it is deemed preferable and will generally be convenient to implement a model expression in a syntax consistent with a standard language while developing the model, it will also be appreciated by those skilled in the art that a parser can be arranged to recognize any particular syntax which may be used to represent an expression to be dynamically evaluated in any language and the invention invoked in response thereto following the methodology of FIG. 1. The invention in accordance with its basic principles could be applied, for example, to a model already fully developed having expressions represented in proprietary languages as discussed above so long as the parser is arranged to recognize the syntax indicative of the existence of an expression to be dynamically evaluated and to extract the information represented at 110 of FIG. 1. In essence, for each expression to be dynamically evaluated in the model, an SQL (or other standard language) query can be formed in accordance with a template containing portions of code lines which are applicable to any query and which can be completed by simply parsing the dynamic expression in any language and transferring the variables, expression and metric name to the template while the values of the variables are provided in the query at 160.

Referring now to FIG. 2, the template of a standard SQL Query pattern will be discussed in detail. The first line is simply a listing of the variables in the model (and derived from the expression to be evaluated therein) as the argument of the command "WITH temp1 (argument) AS. In this case, "temp1" specifies the location of the data for the respective variables and the evaluation result. The second line is the syntactical mark "(". The third line begins with the command "SELECT" and the remainder of the third line and following lines are "variable1 AS variable1", "variable2 AS variable2", . . . "variableN AS variableN", respectively, with the first occurrence of "variable1", "variable2", etc. in respective lines being the data developed earlier during execution of the model and the second occurrence of each "variable1", "variable2", etc. being derived from the expression in the model. These lines simply place the dynamically derived data for each variable into the expression to be evaluated. The number of lines will thus correspond to the number of variables. The group of lines thus far described is indicated by reference numeral 210. It should be noted that this group of lines is formed simply by parsing the expression in the high-level language and that the variable, parameters, output and the like remain intact and compatible with the high level language used in the remainder of the model and its processing.

The following line will be another syntactical mark ");" and the last line will be "SELECT $ModelExpression$ AS output FROM temp1;" where "ModelExpression" is derived from the expression in an arbitrary language in the model being executed. This group of final lines of the SQL Query template is indicated by reference numeral 220.

Figure 3:
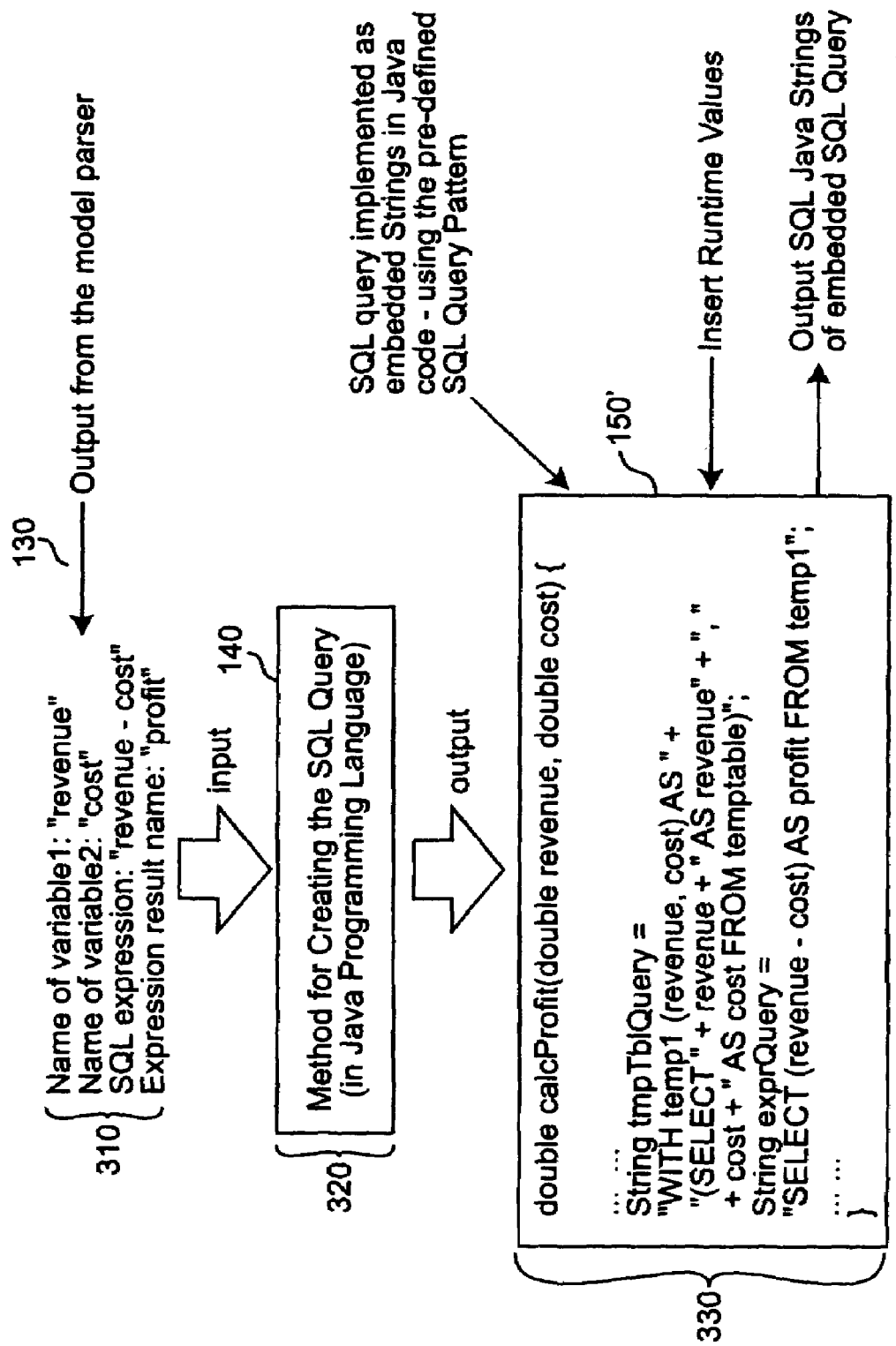
FIG. 3 illustrates the SQL query creation method of FIG. 1 by giving an example where the SQL query is generated as embedded strings in Java code, using the predefined SQL query pattern of FIG. 2.

Referring now to FIG. 3 the workflow in accordance with the invention will be discussed in connection with an example of a model written in Java™. The process of preparation for expression evaluation in accordance with the invention has three basic steps: preparation of the representation of the expression 310, application of a template or pattern 320 and derivation of a standard language (e.g. SQL) query embedded or as if embedded in the model in a proprietary language 330 which can then have quantitative values substituted therein and be evaluated in accordance with a standard evaluation technique and resources, preferably by execution of SQL statements.

The first step of preparation of the query, preferably as statements in SQL compatible syntax, is output from the model parser or other detecting and extracting arrangement, as illustrated at 310. It will be recognized that this step is the same as step 130 described above in connection with FIG. 1 and results in a definition of all needed variables, the expression itself and the name or other identification of the result.

The second step 320 of preparation of the query is to insert the information extracted from the representation of the expression 110 and output by the parser or other arrangement as inputs for creating the standard language (e.g. SQL) query by application of that information to a template or predetermined pattern having all the syntax and form requirements for an embedded standard language query in the Java™ language. This results in an output of SQL Java™ strings 150' corresponding to step 150 discussed above in connection with FIG. 1 but in a form fully compatible with the required form of an embedded SQL query in the Java™ language The third step 330 of deriving the standard language query includes the substitution or insertion of run time values for the respective variables in the intermediate form of the expression 150' and outputting of the completed SQL Java™ strings as an embedded SQL query (e.g. a complete SQL query implemented as embedded strings in Java™ code using the predefined query pattern or template corresponding to the Java™ language.

Again, use of a template or pattern facilitates the process of developing an SQL query since the template or pattern contains all the form and syntax required by the language used for the remainder of the model. In representing an expression to be dynamically evaluated, no more is required of the programmer than to define the metrics appropriate to the expression, writing the expression in standard language (e.g. SQL) format and syntax and naming the result. The processing required to complete the embedded SQL query is limited to substitution in two stage: first to substitute variable definitions for dummy variables in the template and then to substitute run time values for the variable definitions. Therefore, the invention allows the steep learning curves for forming expressions in custom or proprietary languages as well as errors of form and syntax in the standard language to be avoided.

In view of the foregoing, it is seen that the invention provides a technique for dynamic expression evaluation which is predictably rapid and efficient and which can be implemented with the use of any language found to be advantageous or suitable for modeling. The invention allows use of standard technologies for expression representation and evaluation and an extremely simple mechanism for rapid and efficient dynamic evaluation of expression found in modeling tools. The preferred standard query language (SQL) is the ANSI (American National Standards Institute) standard for query representation and most programming languages support embedded SQL execution. Moreover SQL standards and math functions are supported by most database management system (DBMS) vendors and are very rich in computational capabilities; satisfying most expression representation requirements, and widely understood and used. The invention may be embodied as templates recorded as signals on a computer readable medium which can then be imported into a computer program as it is developed or run and may be included in a program on a computer readable medium for performing modeling by a computer.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method for dynamically evaluating expressions in a modeling application in a language for development of a modeling application, said method comprising steps of representing an expression and definitions of variables associated with said expression in a syntax compatible with a standard language to form a representation of said expression, wherein said step of representing said expression comprises a plurality of statements, wherein one of said statements contains said expression, another of said statements contains a name of a result of said expression, and remaining statements define variables contained in said expression, detecting said representation of said expression and extracting said expression and definition of variables, placing said expression and definitions of variables into a pattern to represent said expression in an intermediate form between said syntax and a query in said standard language, said pattern having a form corresponding to an embedded standard language query for said language for development of a modeling application, placing data into the embedded standard language query including said expression and definitions of variables, and evaluating said expression containing said data.

2. The method as recited in claim 1, wherein said representing step includes conversion of the expression from said language for development of a modeling application.

3. The method as recited in claim 1 wherein said embedded standard language query comprises an SQL query.

4. The method as recited in claim 1, wherein said intermediate form corresponds to a pre-defined standard language query template.

5. The method as recited in claim 4, wherein said predefined standard language query template is a standard query language (SQL) template.

6. The method as recited in claim 5, wherein said evaluating step is performed by an SQL engine.

7. The method as recited in claim 1, wherein said evaluating step is performed by a standard language evaluation engine.

8. The method as recited in claim 1, wherein said detecting step is performed by parsing said modeling application.

9. Apparatus for evaluating an expression during modeling of a system or operation including, in combination, a data processor running a model in a language for development of a modeling application to determine quantitative values of variables included in an expression contained in said model, wherein said expression comprises a plurality of statements, wherein one of said statements contains said expression, another of said statements contains a name of a result of said expression, and remaining statements define variables contained in said expression, means for detecting a representation of a said expression which is in a form compatible with a standard language query, and extracting at least said expression and variables contained in said expression, means for placing said expression and variables contained in said expression into an intermediate form corresponding to an embedded standard language query in said language for development of a modeling application, said embedded standard language query forming a representation of said expression in said intermediate form, means for substituting said quantitative values for variables in said representation of said expression in said intermediate form to develop a standard language query, and a standard language evaluation engine for evaluating said standard language query.

10. Apparatus as recited in claim 9, wherein said standard language is standard query language and said standard language evaluation engine is an SQL engine.

11. Apparatus as recited in claim 9, wherein said means for detecting is a parser.

12. Apparatus as recited on claim 9, wherein said means for placing said expression and variables contained in said expression into an intermediate form includes a template.

13. A computer readable medium having computer readable instructions recorded thereon wherein said instructions recorded thereon include a representation of an expression and definitions of variables associated with said expression in a syntax compatible with a standard language thereon and a modeling application which, when run on a computer, cause the computer to perform steps of wherein said representation of said expression and definitions of variables comprises a plurality of statements, wherein one of said statements contains said expression, another of said statements contains a name of a result of said expression, and remaining statements define variables contained in said expression, detecting said representation of said expression and extracting said expression and definition of variables, placing said expression and definitions of variables into a pattern to represent said expression in an intermediate form between said syntax and a query in said standard language, said pattern having a form corresponding to an embedded standard language query for said language for development of a modeling application, placing data into the embedded standard language query including said expression and definitions of variables, and evaluating said expression containing said data.

* * * * *